United States Patent
Grajek

(10) Patent No.: US 12,184,676 B2
(45) Date of Patent: Dec. 31, 2024

(54) IDENTITY TRUST SCORE FOR IDENTITY AND ACCESS MANAGEMENT SYSTEM

(71) Applicant: Garret Grajek, Aliso Viejo, CA (US)

(72) Inventor: Garret Grajek, Aliso Viejo, CA (US)

(*) Notice: Subject to any disclaimer, the term of this patent is extended or adjusted under 35 U.S.C. 154(b) by 239 days.

(21) Appl. No.: 18/080,185

(22) Filed: Dec. 13, 2022

(65) Prior Publication Data

US 2024/0195819 A1   Jun. 13, 2024

(51) Int. Cl.
H04L 9/40   (2022.01)

(52) U.S. Cl.
CPC ........ H04L 63/1416 (2013.01); H04L 63/105 (2013.01); H04L 63/1433 (2013.01)

(58) Field of Classification Search
CPC .............. H04L 63/1416; H04L 63/105; H04L 63/1433
USPC ........................................................ 726/22
See application file for complete search history.

(56) References Cited

U.S. PATENT DOCUMENTS

| | | | |
|---|---|---|---|
| 9,519,682 B1* | 12/2016 | Pujara | H04H 20/28 |
| 11,367,323 B1* | 6/2022 | Shahidzadeh | G07C 9/215 |
| 2019/0356679 A1* | 11/2019 | Sites | H04L 63/1416 |
| 2020/0201910 A1* | 6/2020 | Gavaudan | G06Q 20/32 |
| 2020/0412736 A1* | 12/2020 | Kissell | G06F 16/337 |
| 2023/0065840 A1* | 3/2023 | Jasleen | G06F 21/577 |

* cited by examiner

Primary Examiner — James E Springer
(74) Attorney, Agent, or Firm — Schwegman Lundberg & Woessner, P.A.

(57) ABSTRACT

An identity trust score system is described. In one aspect, a computer-implemented method includes accessing, at a server, identity metadata from a remote Identity and Access Management (IAM) system, the identity metadata indicating identity events associated with one or more users of a user group of the IAM system, computing an identity trust score for the one or more users of the user group based on the identity metadata, and configuring the remote IAM system based on the identity trust score.

18 Claims, 8 Drawing Sheets

IDENTITY TRUST SCORE FOR IDENTITY AND ACCESS MANAGEMENT SYSTEM

TECHNICAL FIELD

The subject matter disclosed herein generally relates to a special-purpose cloud-based machine that computes an identity trust score based on data from existing identity and access management systems, including computerized variants of such special-purpose machines and improvements to such variants.

BACKGROUND

Enterprises are commonly deployed with identity access and management systems (IAM) solutions. These IAM solutions can be deployed on-premise or cloud-based. Both on-premise and cloud-based solutions serve to the functional purpose of holding the entities that constitute the users, both internal and external, of the enterprise and often the service accounts that manage the enterprise services.

These IAM and their affiliated identity solutions are the basis of a functional enterprise. They constitute the internal users, the partners, the customers, and the service accounts managing the enterprise servers and systems. However, those identity solutions present a danger of hackers taking over the accounts for nefarious purposes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
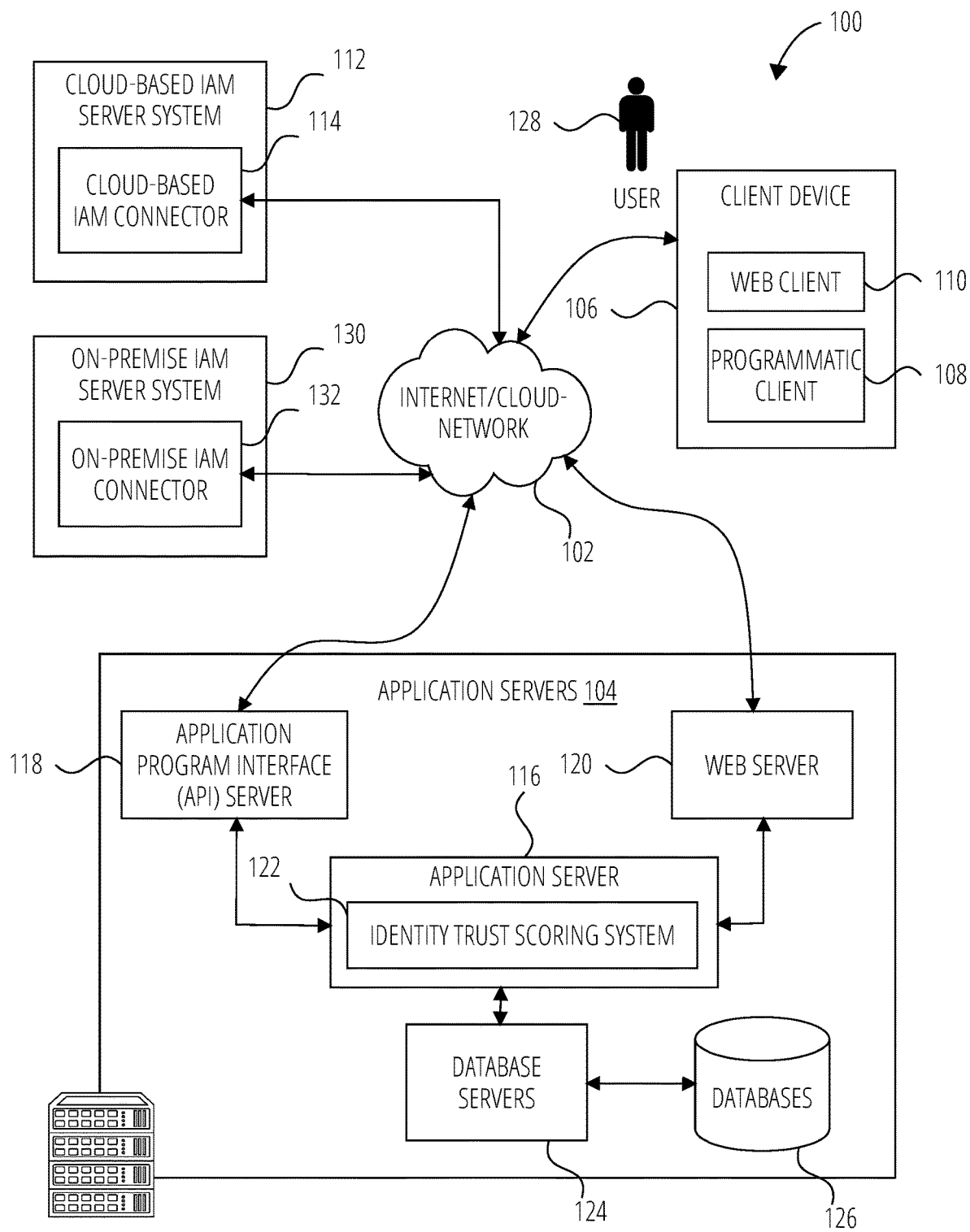
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes an Identity Trust Score System (ITSS) that communicates/integrates with existing IAM solutions (e.g., on-premise and cloud-based) to generate an Identity Trust Score (ITS) for each user, selected group, and/or the other enterprise. As such, the security and risk managers can assess how much confidence they should have in the user entities in the IAM solution and remedy the practice and policies of the users to increase the ITS. This solution is also applicable to the external managed service providers who have the responsibility of the security of these entities.

In one example embodiment, the ITSS uses application SSO and APIs to connect to the existing on-premise and cloud-based IAM solutions. These connectors use existing technologies (e.g., SAML, OIDC, SCIM) to connect to these IAM solutions. Once the ITSS connects to the existing IAM solutions, the ITSS extracts metadata to determine the confidence of each user/group, and thus of the IAM in whole. The ITSS does not pull authentication information (known as identity credentials). Instead, the ITSS pulls or accesses the following (but not limited to) metadata information (also referred to as identity metadata):

An identity identifier
Password policy governing the identity
Last time password was changed
If Identity has "password never expires" enabled
Disabled but not deleted
If two-factor authentication is turned on for the user
Groups the user belongs to
Associate roles (if different from groups)
Attributes, especially those denoting admin rights
Last usage In addition, the ITSS can access behavioral information, usage statistics from the IAM or other resources, such as:

Associated history (including breach hacks associated with accounts)
Usage patterns
Usage patterns of accounts in similar groups Furthermore, the ITSS computes the ITS based on data associated with the user when the last time that a review of the privileges of these accounts has been executed. These are called user access reviews (UARs)—as denoted by NIST SP 800-53 r5 (PR.AC-4)—which calls out that users should have their privileges reviewed by someone other than the identity access engineer. The review can be performed by a business line manager that manages the users and, optionally, coupled with an additional review by the resource owners. The purpose of these reviews is to confirm that the current access a user has (usually denoted by the groups and/or roles in the identity store) is valid. As such, the more recent the access review of the user, the higher the ITS for that user.

The ITSS accumulates and aggregates the metadata information. In one example, the ITSS weights the user confidence data according to expert analysis based on known factors that highlight risk in a user account. These weights could be modified by the administrator of the system—to reflect the values and priorities of the enterprise.

Once the ITS is created and associated with a user in the ITSS, this ITS can then be used by the ITSS to aggregate multiple ITS's into associations based on:
Groups
Roles
Application
Entire Enterprise As such, the security/risk manager can target an individual user, role, group, application to prioritize efforts of identity security to increase the security posture of that resource.

The term "metadata" refers to metadata information that help the enterprise manage the privileges of these user accounts. For example, these include groups, roles and attributes that the IAM solution of other applications can use to determine proper access to resources.

In one aspect, a computer-implemented method includes accessing, at a server, identity metadata from a remote Identity and Access Management (IAM) system, the identity metadata indicating identity events associated with one or more users of a user group of the IAM system, computing an identity trust score for the one or more users of the user group based on the identity metadata, and configuring the remote IAM system based on the identity trust score.

As a result, one or more of the methodologies described herein facilitate solving the technical problem of computer network identity monitoring. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a cloud internet environment 100 in which some example embodiments of the present disclosure may be implemented or deployed. One or more application servers 104 provide server-side functionality via an internet/cloud-network 102 to a networked user device, in the form of a client device 106. A user 128 (e.g., an administrator, a risk manager, a reviewer) operates the client device 106. The client device 106 includes a web client 110, a programmatic client 108 that is hosted and executed on the client device 106.

An Application Program Interface (API) server 118 and a web server 120 provide respective programmatic and web interfaces to application servers 104. A specific application server 116 hosts an Identity Trust Scoring System 122. The Identity Trust Scoring System 122 includes components, modules and/or applications.

The Identity Trust Scoring System 122 retrieves metadata from remote IAM systems (e.g., cloud-based IAM server system 112 and on-premise IAM server system 130) and generates a scoring based on models. The Identity Trust Scoring System 122 communicates with the programmatic client 108 on the client device 106. For example, the programmatic client 108 includes an administrator application that enables an administrator to configure settings (e.g., model weights) at the Identity Trust Scoring System 122. In other examples, the programmatic client 108 includes a reviewer application that enables a reviewer to review the ITS scores from the Identity Trust Scoring System 122.

The Identity Trust Scoring System 122 communicates with the cloud-based IAM connector 114 and aggregates metadata from the cloud-based IAM connector 114. The Identity Trust Scoring System 122 communicates with the on-premise IAM connector 132 and aggregates metadata from the on-premise IAM connector 132. In one example embodiment, the Identity Trust Scoring System 122 trains several machine learning models based on features of the aggregated metadata from cloud-based IAM server system 112 and/or on-premise IAM server system 130. For example, the features include, but are not limited to: password policy governing the identity, last time password was changed, whether an identity has "password never expires" enabled, whether the identity is disabled but not deleted, whether two-factor authentication is turned on for the user, the groups which the user belongs to, associate roles (if different from groups), attributes (e.g., denoting admin rights), last usage, policies, access parameters, device identifiers, user identifiers, enterprise identifiers, group identifiers, time stamp, and security events. Other example features include: associated history (included breach hacks associated with accounts), usage patterns, usage patterns of accounts in similar groups.

In one example, the Identity Trust Scoring System 122 uses the machine learning models to compute an ITS for a user/group based on the aggregate data and the models (e.g., scores from each model). Once the Identity Trust Scoring System 122 computes the ITS for a user, the Identity Trust Scoring System 122 notifies the client device 106 of the user 128 (e.g., reviewer) to review and confirm the ITS. Once the client device 106 confirms to the scoring, the Identity Trust Scoring System 122 updates the score based on a recency of the scoring confirmation.

The application server 116 is shown to be communicatively coupled to database servers 124 that facilitates access to an information storage repository or databases 126. In one example embodiment, the databases 126 includes storage devices that store documents to be processed by the Identity Trust Scoring System 122. For example, the databases 126 include a library of metadata (e.g., device identifiers, user identifiers, enterprise identifiers, group identifiers, time stamp, and security events) and a library of machine learning models.

Additionally, a cloud-based IAM connector 114 executing on a cloud-based IAM server system 112, is shown as having programmatic access to the application server 116 via the programmatic interface provided by the Application Program Interface (API) server 118. For example, the cloud-based IAM connector 114, using information retrieved from the application server 116, may support one or more features or functions on a website hosted by the third party. The cloud-based IAM server system 112 can include an IDAAS (identity as a service) containing user entities and associated data.

The on-premise IAM connector 132 executing on an on-premise IAM server system 130, is shown as having programmatic access to the application server 116 via the programmatic interface provided by the Application Program Interface (API) server 118. For example, the on-premise IAM connector 132, using information retrieved from the application server 116, may support one or more features or functions on a website hosted by the third party. The on-premise IAM server system 130 can include an on-premise data store (LDAP, Microsoft AD, SQL-based database) containing user entities and associated data. The cloud-based IAM connector 114 and on-premise IAM connector 132 can include supported data connection technology (SCIM, SAML, OIDC, APIs) that the Identity Trust Scoring System 122 is able to connect with to obtain user data.

Figure 2:
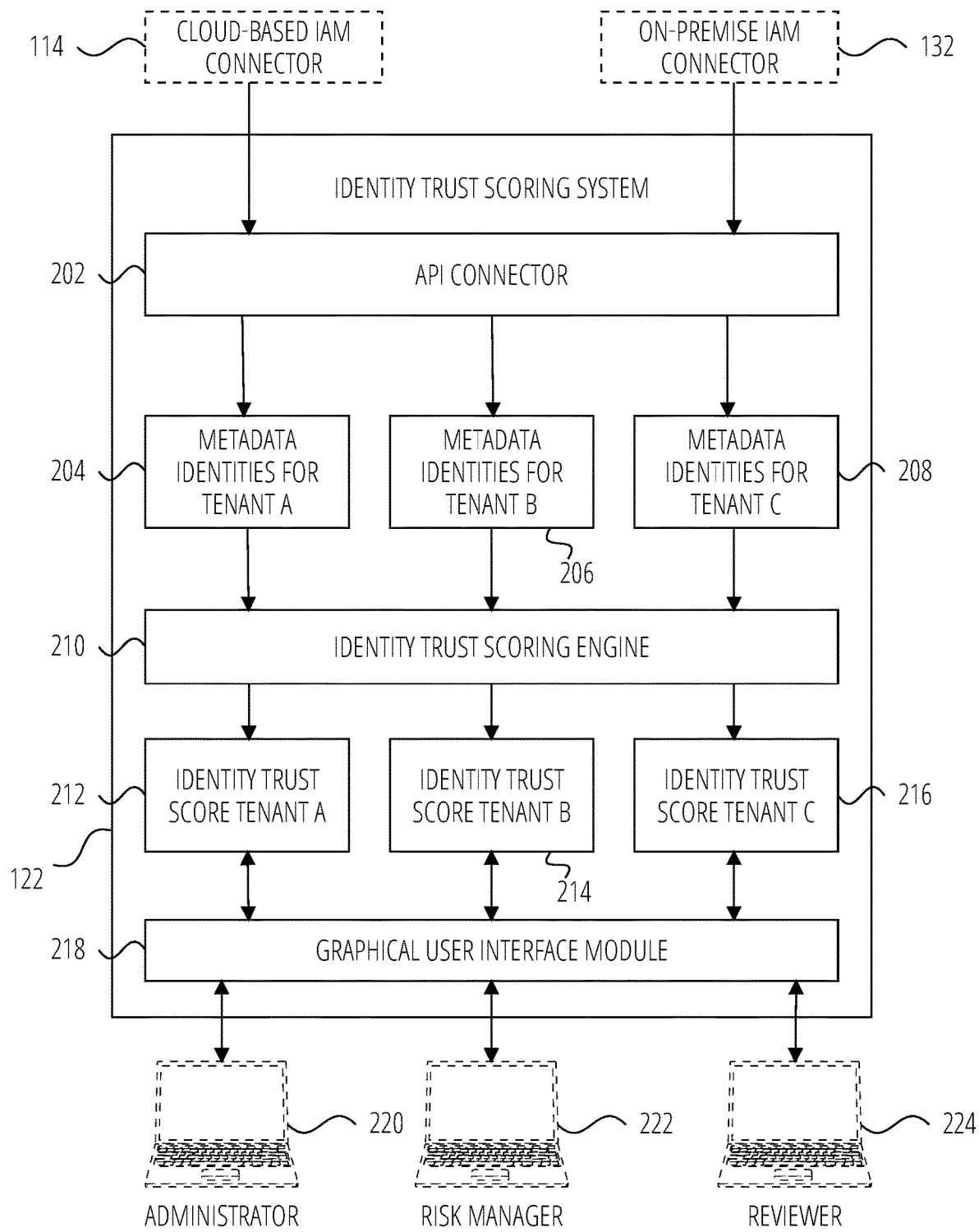
FIG. 2 is a block diagram illustrating an identity trust scoring system in accordance with one example embodiment.

FIG. 2 is a block diagram illustrating the Identity Trust Scoring System 122 in accordance with one example embodiment. The Identity Trust Scoring System 122 includes an API connector 202, a metadata identities from tenant B 206, a metadata identities from tenant C 208, a metadata identities from tenant A 204, an identity trust scoring engine 210, a graphical user interface module 218, an identity trust score tenant A 212, an identity trust score tenant C 216, and an identity trust score tenant B 214.

The API connector 202 communicates with the cloud-based IAM connector 114 and the on-premise IAM connector 132. For example, the API connector 202 accesses identity metadata from the cloud-based IAM connector 114 and the on-premise IAM connector 132. Examples of identity metadata include, but are not limited to:

An identity identifier
Password policy governing the identity
Last time password was changed
If Identity has password never expires enabled
Disabled but not deleted
If two-factor is turned on for the user
Groups the user belongs to
Associate roles (if different from groups)
Attributes, especially those denoting admin rights
Last usage
Breach history or attacks associated with accounts
Usage patterns
Usage patterns of accounts in similar groups FIG. 2 illustrates an example where the combination of cloud-based IAM server system 112 and on-premise IAM server system 130 are configured to generate metadata for identities with separated storage for each tenant. For example, FIG. 2 illustrates identity metadata for three tenants: identity trust score tenant A 212, identity trust score tenant B 214, and identity trust score tenant C 216. In one example, identity trust score tenant A 212 represents data collected for each user (of tenant A) from each respective IAM resource.

The identity trust scoring engine 210 includes a unique scoring system that takes in the identity metadata from metadata identities from tenant A 204, metadata identities from tenant B 206, and metadata identities from tenant C 208. In one example, the identity trust scoring engine 210 includes machine learning models and traditional logic that weights the information to formulate a confidence of the identity/identity profiles. Some of the weights include last usage, MFA usage, group membership, and latest review. In other examples, the identity trust scoring engine 210 computes the ITS using heuristic/usage data from the IAM or other resources. The identity trust scoring engine 210 can generate reports and alerts for entities with high risk scores. The identity trust scoring engine 210 is described in more detail with respect to FIG. 4.

The identity trust scoring engine 210 generates an identity trust score tenant A 212 based on metadata identities from tenant A 204, identity trust score tenant B 214 based on metadata identities from tenant B 206, and identity trust score tenant C 216 based on metadata identities from tenant C 208. For example, each tenant/customer has its own storage of user confidence scores (e.g., ITS). This could be a temporary or permanent storage space. This data indicate Identity Trust Score (ITS) information on individual users, groups, and applications.

The graphical user interface module 218 includes a GUI for sharing the ITS to trusted parties (e.g., administrator client device 220, risk manager client device 222, and reviewer client device 224). Administrator client device 220 includes, for example, ITSS administrators of the respective tenants and trusted and verified security applications. In another example, the ITSS administrator for a corresponding tenant can retrieve the ITS score for the respective user, group, application of the corresponding tenant. In another example, the administrator client device 220 can adjust key time frames (e.g., requirement of how often a user access review (UAR) is conducted).

The graphical user interface module 218 also includes an API for other risk/security applications to access the ITS information. The API would authenticate, authorize, and provide this information to these systems.

Figure 3:
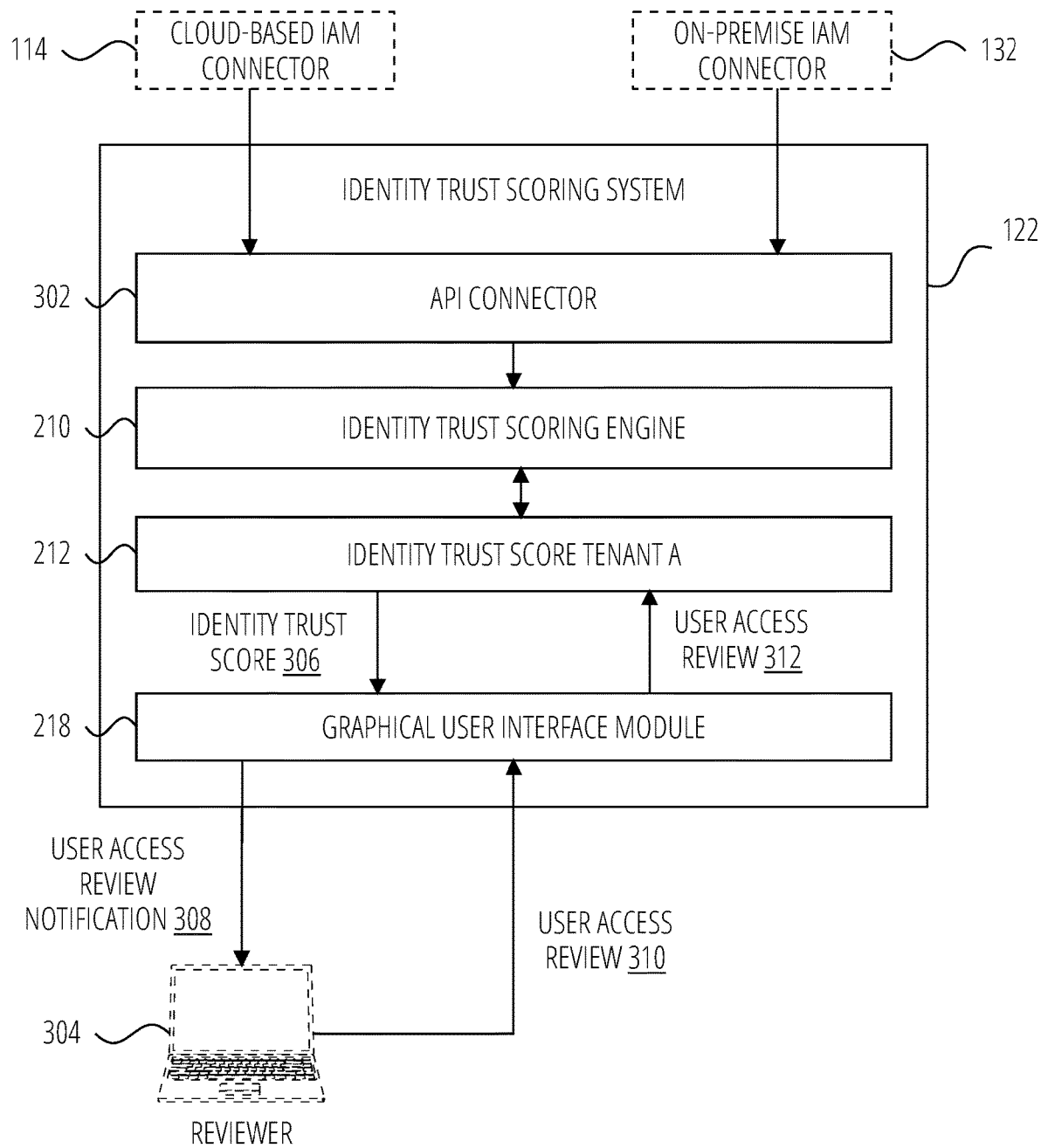
FIG. 3 is a block diagram illustrating an example operation of an identity trust scoring system in accordance with one example embodiment.

FIG. 3 is a block diagram illustrating an example operation of the Identity Trust Scoring System 122 in accordance with one example embodiment. On its first run (for a particular tenant of an IAM system), the Identity Trust Scoring System 122 accumulate as much metadata as possible to determine an initial identity trust score (ITS). It is noted that a one-time pass of identity cannot assume a secure/confident identity. The identity confidence/trust is trusted over time. In one example embodiment, the Identity Trust Scoring System 122 uses a green/yellow/red system of identity confidence after the initial pass. As such, the ranking upon an initial pass cannot be higher than yellow.

In one example, the identity trust scoring engine 210 performs an initial pass that considers the following metadata:

Input all users, or a selected set of users:
A selected set can be filtered by group, role, or application.
Input relevant authentication parameters around the users:
Strength of password
Last password reset
Password is set to never expire
If two-factor authentication is set
Recent activities:
Log on in the last x number of days (e.g., 30 days).
Membership to groups:
All groups
Admin groups highlighted The Identity Trust Scoring System 122 computes this information based on the metadata to determine a confidence trust of the user. Because this is an initial scan—a high (or green) ITS (identity confidence score) cannot be given because of no user access review where managers and/or group owners have reviewed the privileges.

In another example embodiment, the Identity Trust Scoring System 122 accesses the following data:
Access to applications
Length of logons
Time of logons
Device logons The Identity Trust Scoring System 122 updates the ITS based on the above data.

In another example embodiment, the Identity Trust Scoring System 122 calculates the ITS based on the following behavioral information:
Weight of known suspicious activity (negative data)
Weight in comparison to users of the same groups (anomalous data).

After the identity trust score tenant A 212 computes the identity trust score 306, the graphical user interface module 218 generates a user access review notification 308 to the reviewer client device 304. This process can be referred to as User Access Review wherein the privileges of the user are reviewed by personnel out of the IAM engineering group (e.g., reviewer client device 304). According to NIST cyber security framework, SP 800-53 v5, user permissions should be reviewed by their managers and/or business owners (PR.AC-1).

As such, the Identity Trust Scoring System 122 integrates user access review as part of the scoring process by enabling user access reviews of the user based on groups, roles, and permissions, and/or application access. The identity trust scoring engine 210 acts as a centralized communication server by pulling the identity and group information from the cloud-based IAM server system 112 and on-premise IAM server system 130 and then pushing out the reviews to the respective managers and resource owners (e.g., reviewer client device 304).

In one example, the reviewer client device 304 performs the User Access Review as part of a feature of the Identity Trust Scoring System 122. For example, the reviewer client device 304 uses the User Access Review (UAR) feature in the Identity Trust Scoring System 122 to review the permissions of a user (e.g., review can be an individual user, group/role, or application).

The graphical user interface module 218 messages the relevant reviewers (e.g., reviewer client device 304) (selected automatically by the Identity Trust Scoring System 122 because they are the relevant managers) with the relevant information of an access review to these managers. The reviewer client device 304 then review roles/permissions via the Identity Trust Scoring System 122 User Access Review (UAR) of the graphical user interface module 218. For example, the reviewer client device 304 provides user access review 310 to the graphical user interface module 218. The Identity Trust Scoring System 122 collates these UARs into an aggregate report. For example, the identity trust scoring engine 210 updates the ITS based on the user access review 312. In one embodiment, the ITS score is updated for each user in its respective tenant (e.g., identity trust score tenant A 212) reflecting that the user has been reviewed.

With the UAR score now available in the ITS (identity confidence score) for the user—the user can now be granted a green (or highest) level of identity confidence. Thus, the aggregate of the users can give the system a green (or highest) level score for the system.

Figure 4:
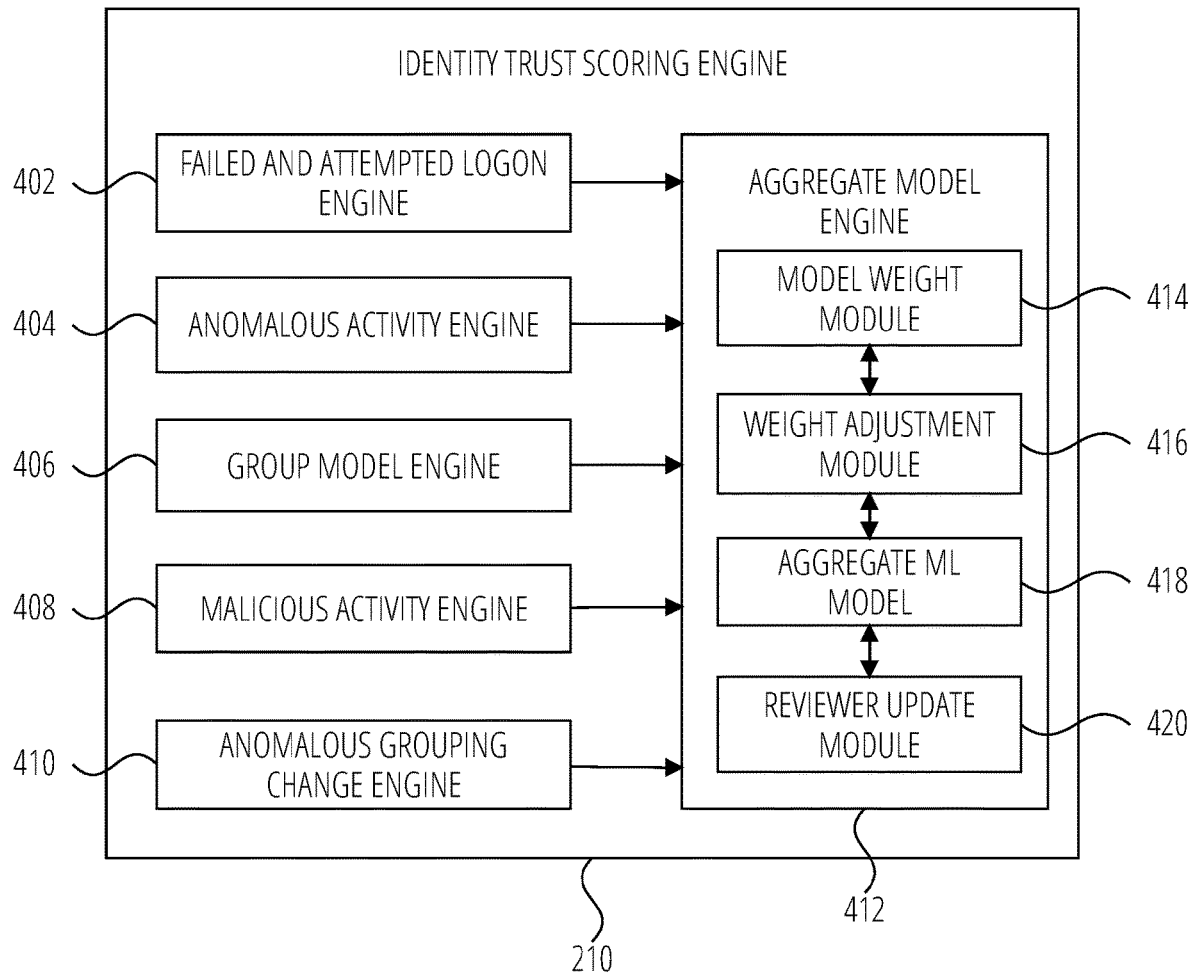
FIG. 4 is a block diagram illustrating an identity trust scoring engine in accordance with one example embodiment.

FIG. 4 is a block diagram illustrating the identity trust scoring engine 210 in accordance with one example embodiment. The identity trust scoring engine 210 includes, but is not limited to, a failed and attempted logon engine 402, an anomalous activity engine 404, a group model engine 406, a malicious activity engine 408, an anomalous grouping change engine 410, and an aggregate model engine 412.

There are multiple machine learning models and discrete rule engines that the identity trust scoring engine 210 can use to calculate an Identity Trust Score (ITS). The identity trust scoring engine 210 can include a machine learning (ML) model and/or discrete rule engine to weight the individual unit scores from the different ML and rules engines. The following rules engines/models are incorporated in the calculation of the ITS.

The failed and attempted logon engine 402 includes a scoring engine (e.g., ML or discrete rule-based engine) that generates a failed and attempted logon score based on input from the failed and attempted logon attempts from the integrated IAM system (e.g., cloud-based IAM server system 112 and on-premise IAM server system 130). High (e.g., above a preset threshold) attempts and failed logons usually denote suspicious activity. The Identity Trust Scoring System 122 takes the failed/attempted logon information and tracks according to each tracked user in the each tracked enterprise. The failed and attempted logon engine 402 generates a score based on the frequency and volume of these failed logons. Log on lockouts information, from failed attempts, can be included in the failed and attempted logon engine 402. The failed and attempted logon engine 402 also considers information concerning idle (e.g., days not utilized). As a dormant account which is now cracked for usage is a red flag.

The anomalous activity engine 404 includes a scoring engine (e.g., ML or discrete rule-based engine) that generates an anomalous activity score based on information from the primary IAM source or other source, SIEM, or another tool, that could provide activities denoted to be anomalous to normal user behavior (with an associated identity tag to help the ITSS score). This type of information comes from products frequently called UEBAs, User Entity Behavior Analytic products. This information can be fed to Identity Trust Scoring System 122, processed, and weighted based on severity and frequency.

The group model engine 406 includes a scoring engine (e.g., ML or discrete rule-based engine) that generates a group model score based on a comparison of the activity of a specific user in contrast to the behavior of the user to users of the same groups. For example, the group model engine 406 identifies anomalous usage in both behavior and frequency of apps—in comparison to other users in the IAM group. As such, the group model engine 406 can detect anomalous behavior of the specific user in the specific organization to the group that user is a member of. In one example, the group model score has substantial weight in the final ITS computation.

The malicious activity engine 408 includes a scoring engine (e.g., ML or discrete rule-based engine) that generates a malicious activity score based on information from the primary IAM source of another source, SIEM or another tool, that could provide activities denoted to malicious user behavior. This type of information usually comes from a threat detection system—and the Identity Trust Scoring System 122 can seek sources that include an identity tag so that the Identity Trust Scoring System 122 can associate this malicious activity with the user in an enterprise that the Identity Trust Scoring System 122 is tracking. In one example, the malicious activity engine 408 intakes the user and an inputted weight of an event. The malicious activity engine 408 then start its own weighting system based on the severity and frequency of these malicious events.

The anomalous grouping change engine 410 includes a scoring engine (e.g., ML or discrete rule-based engine) that generates an anomalous grouping change score based on information from the IAM directly concerning the group memberships and the users in these groups. A hacker will usually attempt privilege escalation. The way privilege escalation usually occurs is via change of group membership and roles (e.g., adding a system group to the membership of a hacked user). Thus, the anomalous grouping change engine 410 detects and notes this change in the model.

Furthermore, a static confidence of a user can be assumed, and decreased, if an anomalous admin privilege is already given to a user's account (that is not reflective of all the users in that group). This should trigger more suspicion and less trust in the user (as would be denoted in the final score from the model/engine) and in the final ITS (Identity Trust Score).

The aggregate model engine 412 includes a scoring engine (e.g., ML or discrete rule-based engine) that generates an aggregate score based on the failed and attempted logon score, the anomalous activity score, the group model score, the malicious activity score, and the anomalous grouping change score. The aggregate model engine 412 includes a meta model or aggregate model. This meta model is to aggregate all the individual trust scores (from the respective individual model/engines above) and weight these models accordingly to create a final ITS. In one example, the aggregate model engine 412 includes a supervised model (aggregate ML model 418) that weights from identity experts using attack information from cyber frameworks such as MITRE ATT&CK framework. The aggregate model engine 412 receives as many available identity vectors and then weighs these vectors in a programmable way that relates to the weight of the threats.

In another example embodiment, the above models can be started as discrete rule engines and once enough data and analytics is performed then supervised and unsupervised models are utilized to weigh in the individual models. In another example, the aggregate model engine 412 includes a reviewer update module 420 that retrieves a user access review from a reviewer and updates the ITS.

In other examples, the aggregate model engine 412 can also include a model weight module 414 and a weight adjustment module 416. The model weight module 414 specifies a weight for each model. The weight adjustment module 416 enables an administrator to modify the different weights. For example, the ITSS weights the user confidence data according to expert analysis based on known factors that highlight risk in a user account. These weights could be modified by the administrator of the system—to reflect the values and priorities of the enterprise.

Figure 5:
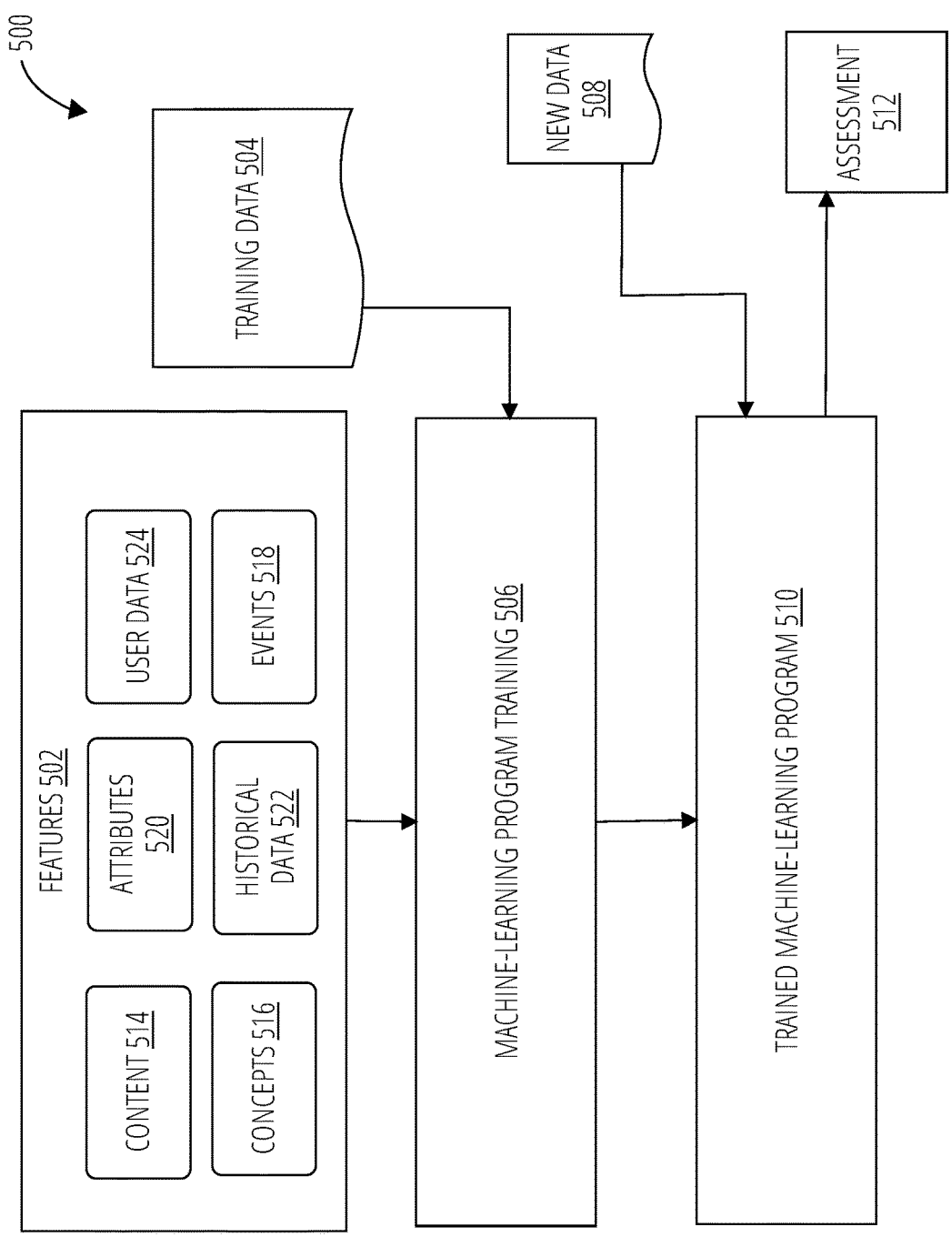
FIG. 5 illustrates training and use of a machine-learning program, according to some example embodiments.

FIG. 5 illustrates training and use of a machine-learning program 500, according to some example embodiments. In some example embodiments, machine-learning programs (MLPs), also referred to as machine-learning algorithms or tools, are used to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 504 (e.g., events) to make data-driven predictions or decisions expressed as outputs or assessments (e.g., assessment 512—such as computing a trust score of the user 128). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, suspicious user or trusted user). Regression algorithms aim at quantifying some items (for example, by providing a value that is a real number such as a trust score).

The machine-learning algorithms use features 502 for analyzing the data to generate an assessment 512. Each of the features 502 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 502 may be of different types and may include one or more of content 514, events 518 (e.g., device identifiers, user identifiers, enterprise identifiers, group identifiers, time stamp, and security events), concepts 516, attributes 520, historical data 522 and/or user data 524 (e.g., user-profile), merely for example.

The machine-learning algorithms use the training data 504 to find correlations among the identified features 502 that affect the outcome or assessment 512. In some example embodiments, the training data 504 includes labeled data, which is known data for one or more identified features 502 and one or more outcomes, such as detecting an anomalous behavior of the user 128, calculating a trust score, etc.

With the training data 504 and the identified features 502, the machine-learning tool is trained at machine-learning program training 506. The machine-learning tool appraises the value of the features 502 as they correlate to the training data 504. The result of the training is the trained machine-learning program 510.

When the trained machine-learning program 510 is used to perform an assessment, new data 508 (e.g., new events) is provided as an input to the trained machine-learning program 510, and the trained machine-learning program 510 generates the assessment 512 (e.g., suspicious user, trusted user) as output.

Figure 6:
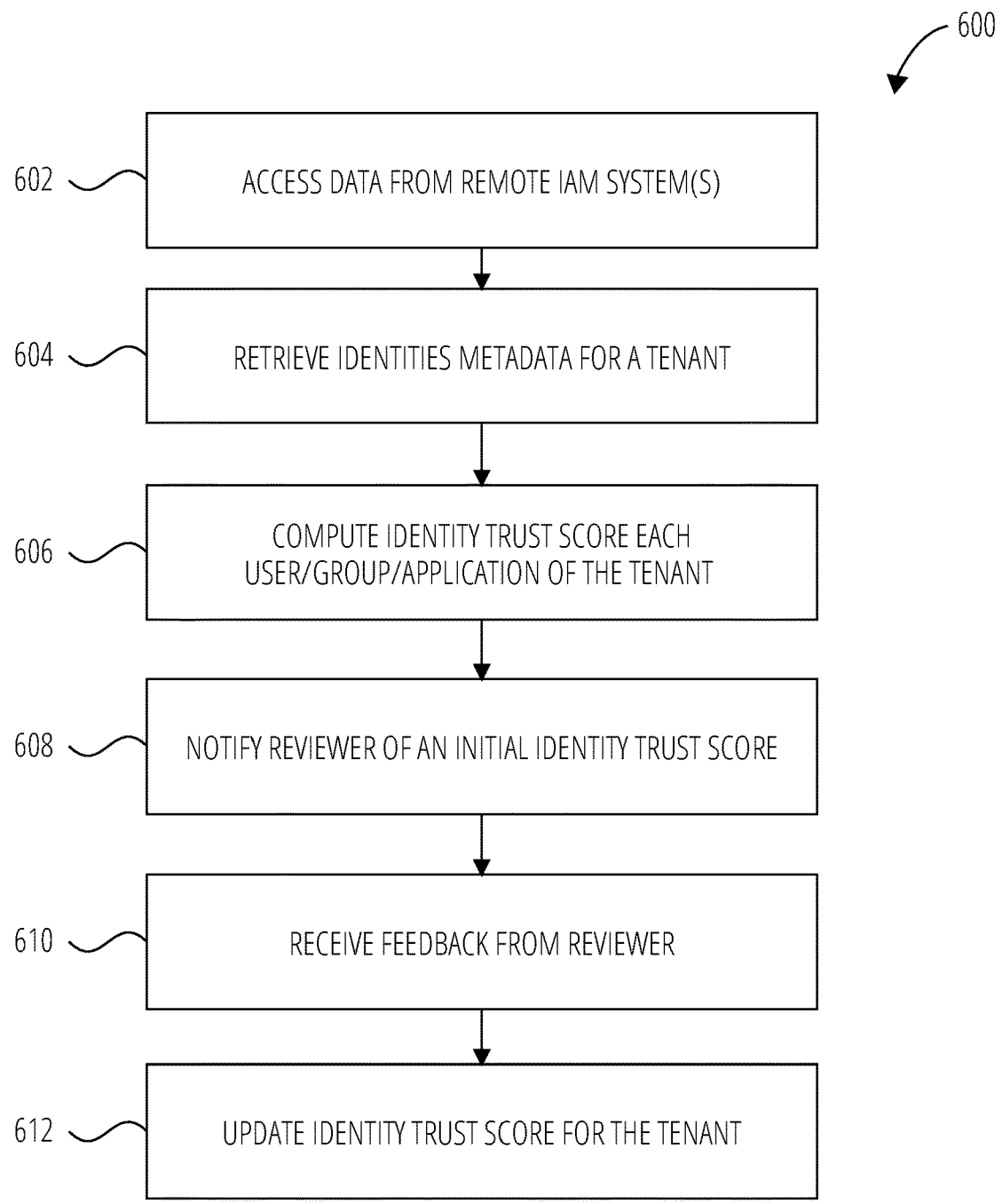
FIG. 6 is a flow diagram illustrating a method for configuring an attestation system in accordance with one example embodiment.

FIG. 6 is a flow diagram illustrating a method for configuring an attestation system in accordance with one example embodiment. Operations in the method 600 may be performed by the Identity Trust Scoring System 122, using components (e.g., modules, engines) described above with respect to FIG. 2. Accordingly, the method 600 is described by way of example with reference to the Identity Trust Scoring System 122. However, it shall be appreciated that at least some of the operations of the method 600 may be deployed on various other hardware configurations or be performed by similar components residing elsewhere. For example, some of the operations may be performed at the client device 106.

According to some examples, the method includes the API connector 202 accessing data from remote IAM system(s) at block 602.

According to some examples, the method includes the API connector 202 retrieving identities metadata for a tenant at block 604.

According to some examples, the method includes the identity trust scoring engine 210 computing identity trust score each user/group/application of the tenant at block 606.

According to some examples, the method includes the graphical user interface module 218 notifying reviewer of an initial identity trust score at block 608.

According to some examples, the method includes the graphical user interface module 218 receiving feedback from reviewer at block 610.

According to some examples, the method includes the identity trust scoring engine 210 updating identity trust score for the tenant at block 612.

In another example, the Identity Trust Scoring System 122 updates configurations of the IAM systems based on the final identity trust score (of a user/group). In other examples, the ITS score can be used as follows:

Applications/Devices (both cloud and on premise)
    Intake the trust score to determine the level of authentication needed for the identity to obtain access.

ITDRs (Identity Threat Detection and Response) resources

These mechanisms show the ITS and then should/could monitor the users of low trust score Zero Trust Network Equip The concept of zero trust is to enforce authentication and authorization based on the latest knowledge of the user.

The ZT network enforcement points should use the ITS to decide the level of trust and re-authentication needed for the user.

IAMs (the originating source)

The Identity Trust Scoring System 122 feedbacks to the original IAM to help the IAM make better and more secure decisions on who to allow access and what level of authentication should be required to give access to the users—based on the current Identity Trust Score.

SOAR (Security Orchestration, Automation and Response)

Users who drop to a low level of ITS should have immediate remediation steps incorporated by the SOAR—including revocation from important resources.

In one example embodiment, the Identity Trust Scoring System 122 includes an ITS transfer system in the form of a REST API or some other mechanism.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
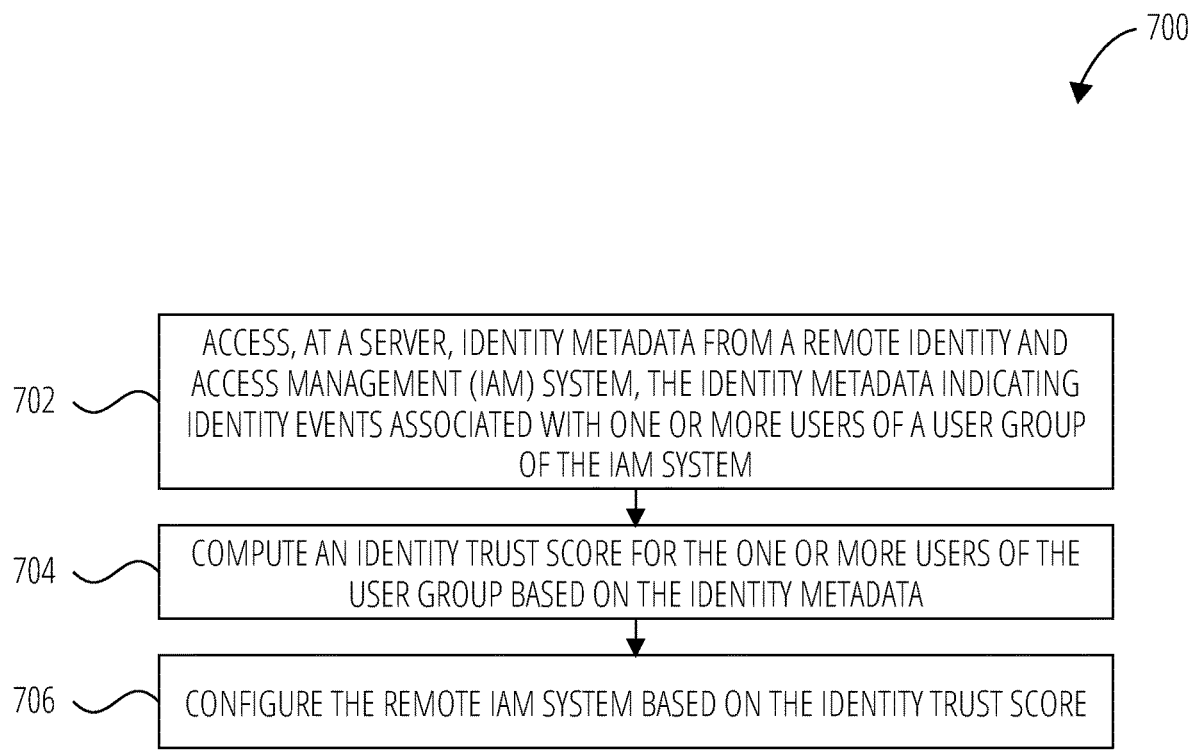
FIG. 7 illustrates a routine 700 in accordance with one embodiment.

FIG. 7 illustrates a routine 700 in accordance with one embodiment. In block 702, routine 700 accesses, at a server, identity metadata from a remote Identity and Access Management (IAM) system, the identity metadata indicating identity events associated with one or more users of a user group of the IAM system. In block 704, routine 700 computes an identity trust score for the one or more users of the user group based on the identity metadata. In block 706, routine 700 configures the remote IAM system based on the identity trust score.

Figure 8:
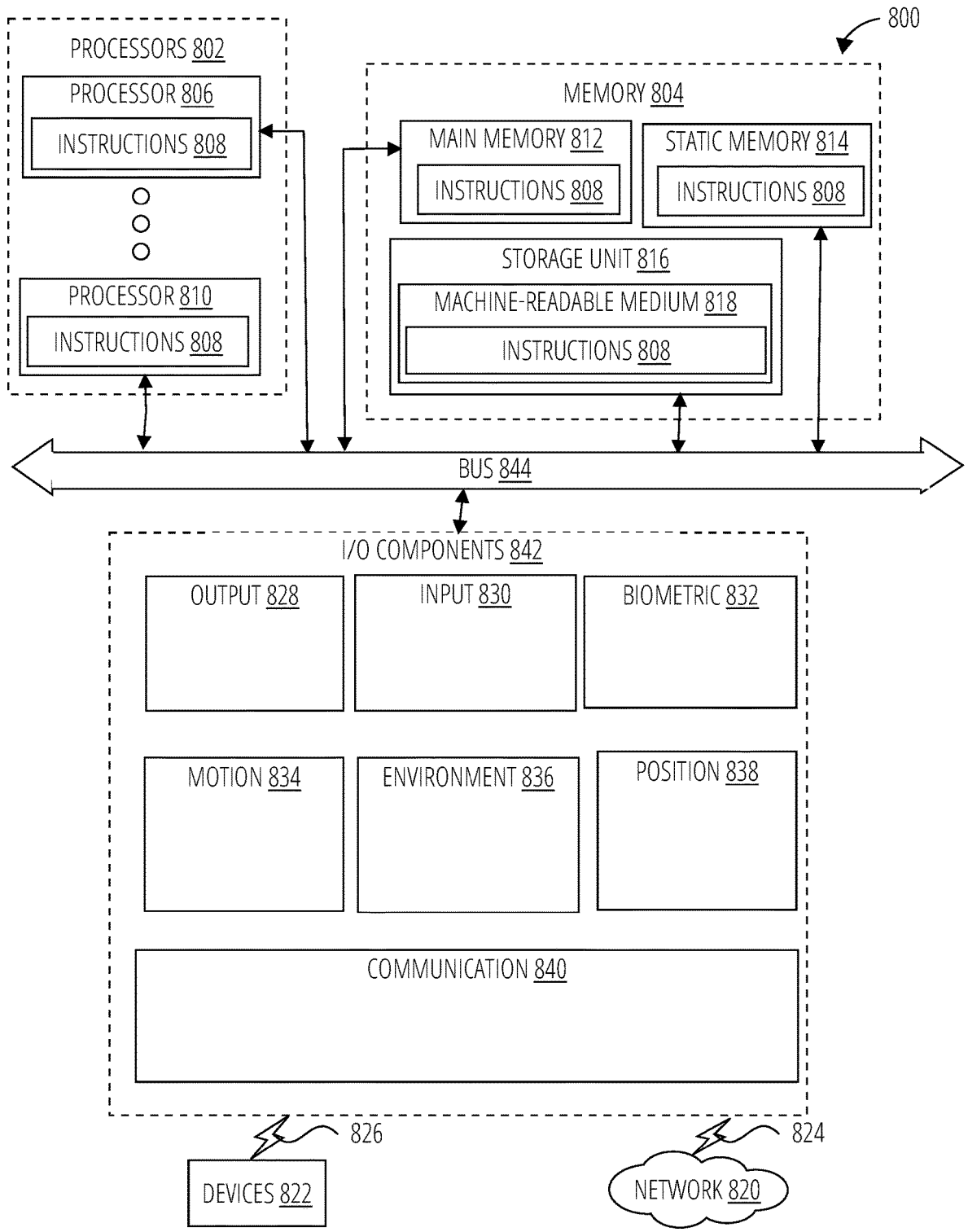
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include Processors 802, memory 804, and I/O Components 842, which may be configured to communicate with each other via a bus 844. In an example embodiment, the Processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 806 and a Processor 810 that execute the instructions 808. The term "Processor" is intended to include multi-core processors that may comprise two or more independent processors (sometimes referred to as "cores") that may execute instructions contemporaneously. Although FIG. 8 shows multiple Processors 802, the machine 800 may include a single Processor with a single core, a single Processor with multiple cores (e.g., a multi-core Processor), multiple processors with a single core, multiple processors with multiples cores, or any combination thereof.

The memory 804 includes a main memory 812, a static memory 814, and a storage unit 816, both accessible to the Processors 802 via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the Processors 802 (e.g., within the Processor's cache memory), or any suitable combination thereof, during execution thereof by the machine 800.

The I/O Components 842 may include a wide variety of components to receive input, provide output, produce output, transmit information, exchange information, capture measurements, and so on. The specific I/O Components 842 that are included in a particular machine will depend on the type of machine. For example, portable machines such as mobile phones may include a touch input device or other such input mechanisms, while a headless server machine will likely not include such a touch input device. It will be appreciated that the I/O Components 842 may include many other components that are not shown in FIG. 8. In various example embodiments, the I/O Components 842 may include output Components 828 and input Components 830. The output Components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input Components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O Components 842 may include biometric Components 832, motion Components 834, environmental Components 836, or position Components 838, among a wide array of other components. For example, the biometric Components 832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 834 include acceleration sensor components (e.g., accelerometer), gravitation sensor components, rotation sensor components (e.g., gyroscope), and so forth. The environmental Components 836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position Components 838 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O Components 842 further include communication Components 840 operable to couple the machine 800 to a network 820 or devices 822 via a coupling 824 and a coupling 826, respectively. For example, the communication Components 840 may include a network interface Component or another suitable device to interface with the network 820. In further examples, the communication Components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication Components 840 may detect identifiers or include components operable to detect identifiers. For example, the communication Components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication Components 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the Processors 802) and/or storage unit 816 may store one or more sets of instructions and data structures (e.g., software) embodying or used by any one or more of the methodologies or functions described herein. These instructions (e.g., the instructions 808), when executed by Processors 802, cause various operations to implement the disclosed embodiments.

The instructions 808 may be transmitted or received over the network 820, using a transmission medium, via a network interface device (e.g., a network interface Component included in the communication Components 840) and using any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Examples

Example 1 is a computer-implemented method comprising: accessing, at a server, identity metadata from a remote Identity and Access Management (IAM) system, the identity metadata indicating identity events associated with one or more users of a user group of the IAM system; computing an identity trust score for the one or more users of the user group based on the identity metadata; and configuring the remote IAM system based on the identity trust score.

Example 2 includes the method of example 1, wherein computing the identity trust score comprises: computing, using a logon attempt machine learning model, a logon attempt metric based on a frequency and volume of attempted and failed logons at the remote IAM system; computing, using an anomalous activity machine learning model, an anomalous activity metric based on anomalous activities detected by a user entity behavior analytic system coupled to the remote IAM system; computing, using a group model anomalous machine learning model, a group model anomalous metric based on activities of a first user of the user group in comparison with activities of other users of the user group; computing, using a malicious activity machine learning model, a malicious activity metric based on malicious activities at the remote IAM system; computing, using an anomalous group membership change machine learning model, an anomalous group membership change metric based on changes to memberships to the user group and changes to roles of the one or more users in the user group; and computing, using an aggregate score model, an aggregate score based on a logon attempt weight, the logon attempt metric, an anomalous activity weight, the anomalous activity metric, a group model weight, the group model anomalous metric, a malicious activity weight, the malicious activity metric, an anomalous group membership change weight, and the anomalous group membership change metric, wherein the identity trust score of the first user includes the aggregate score of the first user.

Example 3 includes the method of example 2, further comprising: receiving a weight adjustment configuration from a client device of a risk manager of the server; updating identity trust score weights by adjusting the logon attempt weight, the anomalous activity weight, the group model weight, the malicious activity weight, and the anomalous group membership change weight based on the weight adjustment configuration; and updating the identity trust score based on the updated identity trust score weights.

Example 4 includes the method of example 1, wherein computing the identity trust score comprises: computing an initial identity trust score of a user of the user group; generating a notification to a client device of a reviewer associated with the IAM system, the notification indicating the initial identity trust score of the user; receiving feedback from the client device, the feedback confirming the initial trust score of the user; and updating the identity trust score based on receiving the feedback and a recency of the feedback.

Example 5 includes the method of example 1, further comprising: identifying a first user with an identity trust score below a threshold identity trust score; and configuring, at the remote IAM system, the accounts of the first user, wherein configuring comprises revoking privileges of the first user.

Example 6 includes the method of example 1, further comprising: computing an aggregate identity trust based on identity trust scores associated with the user group, a user role, an application, or an enterprise.

Example 7 includes the method of example 1, wherein the identity metadata comprises a combination of an identity identifier, password policy governing the identity, last time password was changed, whether the identity has password never expires enabled, whether the identity is disabled but not deleted, whether two-factor authentication is turned on for a user, the groups the user belongs to, roles of the user, administrator rights attributes of the user, and last usage of the user.

Example 8 includes the method of example 1, further comprising: accessing behavior data from the remote IAM system, wherein the behavior data indicate associated history, included breach hacks associated with accounts, usage patterns, and usage patterns of accounts in similar groups.

Example 9 includes the method of example 1, further comprising: determining a recency of a review of the identity trust score of a user, wherein the identity trust score of the user is based on the recency of the review of the identity trust score of the user.

Example 10 includes the method of example 1, wherein the remote IAM system comprises at least one of a cloud-based IAM system or an on-premise IAM system.

Example 11 is a computing apparatus comprising: a processor; and a memory storing instructions that, when executed by the processor, configure the apparatus to: access, at a server, identity metadata from a remote Identity and Access Management (IAM) system, the identity metadata indicating identity events associated with one or more users of a user group of the IAM system; compute an identity trust score for the one or more users of the user group based on the identity metadata; and configure the remote IAM system based on the identity trust score.

Example 12 includes the computing apparatus of example 11, wherein computing the identity trust score comprises: compute, using a logon attempt machine learning model, a logon attempt metric based on a frequency and volume of attempted and failed logons at the remote IAM system; compute, using an anomalous activity machine learning model, an anomalous activity metric based on anomalous activities detected by a user entity behavior analytic system coupled to the remote IAM system; computing, using a group model anomalous machine learn model, a group model anomalous metric based on activities of a first user of the user group in comparison with activities of other users of the user group; compute, using a malicious activity machine learning model, a malicious activity metric based on malicious activities at the remote IAM system; compute, using an anomalous group membership change machine learning model, an anomalous group membership change metric based on changes to memberships to the user group and changes to roles of the one or more users in the user group;

and compute, using an aggregate score model, an aggregate score based on a logon attempt weight, the logon attempt metric, an anomalous activity weight, the anomalous activity metric, a group model weight, the group model anomalous metric, a malicious activity weight, the malicious activity metric, an anomalous group membership change weight, and the anomalous group membership change metric, wherein the identity trust score of the first user includes the aggregate score of the first user.

Example 13 includes the computing apparatus of example 12, wherein the instructions further configure the apparatus to: receive a weight adjustment configuration from a client device of a risk manager of the server; update identity trust score weights by adjusting the logon attempt weight, the anomalous activity weight, the group model weight, the malicious activity weight, and the anomalous group membership change weight based on the weight adjustment configuration; and update the identity trust score based on the updated identity trust score weights.

Example 14 includes the computing apparatus of example 11, wherein computing the identity trust score comprises: compute an initial identity trust score of a user of the user group; generate a notification to a client device of a reviewer associated with the IAM system, the notification indicating the initial identity trust score of the user; receive feedback from the client device, the feedback confirming the initial trust score of the user; and update the identity trust score based on receiving the feedback and a recency of the feedback.

Example 15 includes the computing apparatus of example 11, wherein the instructions further configure the apparatus to: identify a first user with an identity trust score below a threshold identity trust score; and configure, at the remote IAM system, the accounts of the first user, wherein configuring comprises revoking privileges of the first user.

Example 16 includes the computing apparatus of example 11, wherein the instructions further configure the apparatus to: compute an aggregate identity trust based on identity trust scores associated with the user group, a user role, an application, or an enterprise.

Example 17 includes the computing apparatus of example 11, wherein the identity metadata comprises a combination of an identity identifier, password policy govern the identity, last time password was changed, whether the identity has password never expires enabled, whether the identity is disabled but not deleted, whether two-factor authentication is turned on for a user, the groups the user belongs to, roles of the user, administrator rights attributes of the user, and last usage of the user.

Example 18 includes the computing apparatus of example 11, wherein the instructions further configure the apparatus to: access behavior data from the remote IAM system, wherein the behavior data indicate associated history, included breach hacks associated with accounts, usage patterns, and usage patterns of accounts in similar groups.

Example 19 includes the computing apparatus of example 11, wherein the instructions further configure the apparatus to: determine a recency of a review of the identity trust score of a user, wherein the identity trust score of the user is based on the recency of the review of the identity trust score of the user.

Example 20 is a non-transitory computer-readable storage medium, the computer-readable storage medium including instructions that when executed by a computer, cause the computer to: access, at a server, identity metadata from a remote Identity and Access Management (IAM) system, the identity metadata indicating identity events associated with one or more users of a user group of the IAM system; compute an identity trust score for the one or more users of the user group based on the identity metadata; and configure the remote IAM system based on the identity trust score.

What is claimed is:

1. A computer-implemented method comprising:
accessing, at a server, identity metadata from a remote Identity and Access Management (IAM) system, the identity metadata indicating identity events associated with one or more users of a user group of the IAM system;
computing an identity trust score for the one or more users of the user group based on the identity metadata; and
configuring the remote IAM system based on the identity trust score,
wherein computing the identity trust score comprises:
computing, using a logon attempt machine learning model, a logon attempt metric based on a frequency and volume of attempted and failed logons at the remote IAM system;
computing, using an anomalous activity machine learning model, an anomalous activity metric based on anomalous activities detected by a user entity behavior analytic system coupled to the remote IAM system;
computing, using a group model anomalous machine learning model, a group model anomalous metric based on activities of a first user of the user group in comparison with activities of other users of the user group;
computing, using a malicious activity machine learning model, a malicious activity metric based on malicious activities at the remote IAM system;
computing, using an anomalous group membership change machine learning model, an anomalous group membership change metric based on changes to memberships to the user group and changes to roles of the one or more users in the user group; and
computing, using an aggregate score model, an aggregate score based on a logon attempt weight, the logon attempt metric, an anomalous activity weight, the anomalous activity metric, a group model weight, the group model anomalous metric, a malicious activity weight, the malicious activity metric, an anomalous group membership change weight, and the anomalous group membership change metric,
wherein the identity trust score of the first user includes the aggregate score of the first user.

2. The computer-implemented method of claim 1, further comprising:
receiving a weight adjustment configuration from a client device of a risk manager of the server;
updating identity trust score weights by adjusting the logon attempt weight, the anomalous activity weight, the group model weight, the malicious activity weight, and the anomalous group membership change weight based on the weight adjustment configuration; and
updating the identity trust score based on the updated identity trust score weights.

3. The computer-implemented method of claim 1, wherein computing the identity trust score comprises:
computing an initial identity trust score of a user of the user group;
generating a notification to a client device of a reviewer associated with the IAM system, the notification indicating the initial identity trust score of the user;
receiving feedback from the client device, the feedback confirming the initial trust score of the user; and updating the identity trust score based on receiving the feedback and a recency of the feedback.

4. The computer-implemented method of claim 1, further comprising:
identifying a first user with an identity trust score below a threshold identity trust score; and
configuring, at the remote IAM system, the accounts of the first user, wherein configuring comprises revoking privileges of the first user.

5. The computer-implemented method of claim 1, further comprising:
computing an aggregate identity trust based on identity trust scores associated with the user group, a user role, an application, or an enterprise.

6. The computer-implemented method of claim 1, wherein the identity metadata comprises a combination of an identity identifier, password policy governing the identity, last time password was changed, whether the identity has password never expires enabled, whether the identity is disabled but not deleted, whether two-factor authentication is turned on for a user, the groups the user belongs to, roles of the user, administrator rights attributes of the user, and last usage of the user.

7. The computer-implemented method of claim 1, further comprising:
accessing behavior data from the remote IAM system,
wherein the behavior data indicate associated history, included breach hacks associated with accounts, usage patterns, and usage patterns of accounts in similar groups.

8. The computer-implemented method of claim 1, further comprising:
determining a recency of a review of the identity trust score of a user,
wherein the identity trust score of the user is based on the recency of the review of the identity trust score of the user.

9. The computer-implemented method of claim 1, wherein the remote IAM system comprises at least one of a cloud-based IAM system or an on-premise IAM system.

10. A computing apparatus comprising:
a processor; and
a memory storing instructions that, when executed by the processor, configure the apparatus to:
access, at a server, identity metadata from a remote Identity and Access Management (IAM) system, the identity metadata indicating identity events associated with one or more users of a user group of the IAM system;
compute an identity trust score for the one or more users of the user group based on the identity metadata; and
configure the remote IAM system based on the identity trust score,
wherein computing the identity trust score comprises:
compute, using a logon attempt machine learning model, a logon attempt metric based on a frequency and volume of attempted and failed logons at the remote IAM system;
compute, using an anomalous activity machine learning model, an anomalous activity metric based on anomalous activities detected by a user entity behavior analytic system coupled to the remote IAM system;
compute, using a group model anomalous machine learn model, a group model anomalous metric based on activities of a first user of the user group in comparison with activities of other users of the user group;
compute, using a malicious activity machine learning model, a malicious activity metric based on malicious activities at the remote IAM system;
compute, using an anomalous group membership change machine learning model, an anomalous group membership change metric based on changes to memberships to the user group and changes to roles of the one or more users in the user group; and
compute, using an aggregate score model, an aggregate score based on a logon attempt weight, the logon attempt metric, an anomalous activity weight, the anomalous activity metric, a group model weight, the group model anomalous metric, a malicious activity weight, the malicious activity metric, an anomalous group membership change weight, and the anomalous group membership change metric,
wherein the identity trust score of the first user includes the aggregate score of the first user.

11. The computing apparatus of claim 10, wherein the instructions further configure the apparatus to:
receive a weight adjustment configuration from a client device of a risk manager of the server;
update identity trust score weights by adjusting the logon attempt weight, the anomalous activity weight, the group model weight, the malicious activity weight, and the anomalous group membership change weight based on the weight adjustment configuration; and
update the identity trust score based on the updated identity trust score weights.

12. The computing apparatus of claim 10, wherein computing the identity trust score comprises:
compute an initial identity trust score of a user of the user group;
generate a notification to a client device of a reviewer associated with the IAM system, the notification indicating the initial identity trust score of the user;
receive feedback from the client device, the feedback confirming the initial trust score of the user; and
update the identity trust score based on receiving the feedback and a recency of the feedback.

13. The computing apparatus of claim 10, wherein the instructions further configure the apparatus to:
identify a first user with an identity trust score below a threshold identity trust score; and
configure, at the remote IAM system, the accounts of the first user, wherein configuring comprises revoking privileges of the first user.

14. The computing apparatus of claim 10, wherein the instructions further configure the apparatus to:
compute an aggregate identity trust based on identity trust scores associated with the user group, a user role, an application, or an enterprise.

15. The computing apparatus of claim 10, wherein the identity metadata comprises a combination of an identity identifier, password policy govern the identity, last time password was changed, whether the identity has password never expires enabled, whether the identity is disabled but not deleted, whether two-factor authentication is turned on for a user, the groups the user belongs to, roles of the user, administrator rights attributes of the user, and last usage of the user.

16. The computing apparatus of claim 10, wherein the instructions further configure the apparatus to:

access behavior data from the remote IAM system,
wherein the behavior data indicate associated history, included breach hacks associated with accounts, usage patterns, and usage patterns of accounts in similar groups.

17. The computing apparatus of claim 10, wherein the instructions further configure the apparatus to:

determine a recency of a review of the identity trust score of a user,
wherein the identity trust score of the user is based on the recency of the review of the identity trust score of the user.

18. A non-transitory computer-readable storage medium, the computer-readable storage medium including instructions that when executed by a computer, cause the computer to:

access, at a server, identity metadata from a remote Identity and Access Management (IAM) system, the identity metadata indicating identity events associated with one or more users of a user group of the IAM system;
compute an identity trust score for the one or more users of the user group based on the identity metadata; and
configure the remote IAM system based on the identity trust score,
wherein computing the identity trust score comprises:
compute, using a logon attempt machine learning model, a logon attempt metric based on a frequency and volume of attempted and failed logons at the remote IAM system;
compute, using an anomalous activity machine learning model, an anomalous activity metric based on anomalous activities detected by a user entity behavior analytic system coupled to the remote IAM system;
compute, using a group model anomalous machine learn model, a group model anomalous metric based on activities of a first user of the user group in comparison with activities of other users of the user group;
compute, using a malicious activity machine learning model, a malicious activity metric based on malicious activities at the remote IAM system;
compute, using an anomalous group membership change machine learning model, an anomalous group membership change metric based on changes to memberships to the user group and changes to roles of the one or more users in the user group; and
compute, using an aggregate score model, an aggregate score based on a logon attempt weight, the logon attempt metric, an anomalous activity weight, the anomalous activity metric, a group model weight, the group model anomalous metric, a malicious activity weight, the malicious activity metric, an anomalous group membership change weight, and the anomalous group membership change metric,
wherein the identity trust score of the first user includes the aggregate score of the first user.

* * * * *